United States Patent [19]

Gerber et al.

[11] Patent Number: 4,763,980
[45] Date of Patent: Aug. 16, 1988

[54] METHOD AND APPARATUS FOR CENTERING THE CORE OF A LIGHT GUIDE FIBER IN A LIGHT GUIDE END PORTION

[75] Inventors: Hans Gerber, Minusio; Silvio Marazzi, Cavigliano, both of Switzerland

[73] Assignee: Diamond SA, Losone, Switzerland

[21] Appl. No.: 868,708

[22] Filed: May 30, 1986

[30] Foreign Application Priority Data

Jun. 20, 1985 [CH] Switzerland ............. 2611/85

[51] Int. Cl.$^4$ ................................................. G02B 6/36
[52] U.S. Cl. ................................. 350/96.20; 350/96.15
[58] Field of Search .............. 350/96.15, 96.16, 96.20, 350/96.21

[56] References Cited

U.S. PATENT DOCUMENTS

| 4,265,511 | 5/1981 | Nicia et al. ............. 350/96.20 X |
| 4,289,374 | 9/1981 | Franken et al. ........... 350/96.20 |
| 4,440,471 | 4/1984 | Knowles .................. 350/96.20 |
| 4,482,201 | 11/1984 | Dousset .................. 350/96.20 |
| 4,490,006 | 12/1984 | Lidholt .................. 350/96.20 |

Primary Examiner—John Lee
Assistant Examiner—Phan Heartney
Attorney, Agent, or Firm—William R. Hinds

[57] ABSTRACT

The eccentricity of the core of the light guide fiber relative to the outer casing of the light guide end portion is detected by viewing the end face while simultaneously rotating the light guide end portion. When an eccentricity is detected, the light guide fiber is displaced by impressing an impressing segment into the end face of the light guide end portion until the core of the light guide fiber extends coaxially with respect to the central axis of the light guide end portion. For that purpose the light guide end portion is clamped in an adjusting device under a microscope.

11 Claims, 5 Drawing Sheets

METHOD AND APPARATUS FOR CENTERING THE CORE OF A LIGHT GUIDE FIBER IN A LIGHT GUIDE END PORTION

FIELD OF THE INVENTION

The invention relates to a method of centering the core of a light guide fiber in a light guide end portion in which the fiber end is surrounded at least at the end face by a plastically deformable material, wherein for the purpose of pre-centering the light guide fiber relative to the central axis of the light guide end portion, firstly an annular upsetting tool which concentrically surrounds the light guide fiber is pressed against the end face so that the resulting annular impression fixes and centers the light guide fiber. The invention also relates to an apparatus for carrying out the method. Such methods are intended to provide for optimum positioning of the light guide fiber in the light guide end portion so that a maximum amount of light can be transmitted from one core to another in the plug-type connection.

DESCRIPTION OF THE PRIOR ART

Any light guide fiber comprises a light-conducting core and a casing around the core. As, due to the manner of manufacture, the core does not extend in absolutely concentric relationship with respect to the outer casing of the light guide fiber, efforts are made in regard to optical plug connections to provide for core-to-core positioning that has the lowest level of attenuation. Various methods are already known for centering the core of a light guide fiber relative to the outside boundary surface of a plug. Thus, for example, the article 'New Connectors for an Experimental Optical Fiber Transmission System' in Review of the Electrical Communication, Volume 26, No. 5/6 1978 by Suzuki and Koyama discloses a method in which the light guide fiber is adjustable in the center of a plug sleeve by a manipulator. The end face of the plug sleeve, with the fiber end held therein, is viewed by means of a microscope which transmits an image of the end face on to an image screen. The screen is provided with cross hairs or with concentric rings which mark the center of the plug sleeve. The manipulator is actuated until the center of the fiber core is disposed coaxially with the markings on the screen. The space between the plug sleeve and the adjusted light guide fiber is now filled with an epoxy resin.

A quite similar method is also disclosed in DE-A-2704140. Preferably light is introduced into the light guide fiber for the purposes of viewing the fiber core in the microscope.

The known methods are relatively expensive both in regard to the amount of time involved and also in regard to the equipment necessary, and therefore are not suitable for assembly of a plug in the field. In the event of assembly in the field, it must be possible to assemble the plugs, even under difficult conditions, with the very minimum of attenuation losses. For that purpose, light guide end portions have been found to be particularly suitable, in which the light guide fiber is inserted into a bore which is as central as possible, at the end of the light guide end portion. Centering is effected by means of an annular upsetting tool which is pressed against the plastically deformable end face of the end portion concentrically with respect to the fiber. In that method the reference surface for the upsetting tool is the high-precision outside casing of the light guide end portion. The resulting annular impression centers the light guide fiber and at the same time fixes it in the bore. A centering method of that kind is disclosed in the present inventors' EP-A-94906 assigned to Diamond SA.

In that known centering method for centering the light guide fiber by upsetting of material, it is not possible to take account of the fluctuations in tolerance of concentricity of the fiber core. However that deviation may be three to four $\mu$m, which can already result in perceptible attenuation losses in relation to fibers with a high transmission capacity.

SUMMARY OF THE INVENTION

A problem of the present invention is therefore that of improving the impressing method for centering a light guide fiber in a light guide end portion, in such a way that core-to-core positioning of the fiber is possible under in-field conditions, without expensive ancillary equipment. A further object of the present invention is that of so improving the light guide end portion that, in the plug connection, attenuation losses are avoided, which can occur due to interruption of the core-to-core contact of the fibers to be connected.

According to the invention there is provided a method of centering the core of a light guide fiber in a light guide end portion in which the fiber end is surrounded at least at the end face by a plastically deformable material, wherein for the purposes of precentering of the light guide fiber relative to the central axis of the light guide end portion, firstly an annular upsetting tool which concentrically surrounds the light guide fiber is pressed against the end face so that the resulting annular impression fixes and centers the light guide fiber, the light guide end portion with the precentered light guide fiber is then clamped into an adjusting device and light is introduced into the light guide fiber, the relative position of the fiber core with respect to the central axis of the light guide end portion is detected by means of the light beam issuing from the fiber core and, when a deviation is detected, a segment-shaped upsetting tool is pressed into the existing annular impression until the fiber core extends coaxially with the light guide end portion, the segment-shaped upsetting tool being applied in that arc of the annular impression which subtends an eccentricity of the fiber core.

According to the invention also apparatus for effecting the aforesaid method comprises a sleeve with a high-precision bore for co-axially receiving a light guide end portion to be rotated therein and a punch member with an impressing segment that is axially displaceable in the bore.

It will be seen that the post-impression operation using the segment-shaped upsetting tool in the already existing annular impression permits positioning of the core solely by deformation at one side of the material surrounding the light guide fiber. The adjusting device can be readily taken along for use in the field.

The relative position of the fiber core is ascertained in a very simple manner by the light guide end portion being rotated in the adjusting device about the central axis, the movement of the fiber core being observed by way of a marking which is coaxial with respect to the light guide end portion. If the fiber core does not extend concentrically with the central axis of the light guide end portion, then it is caused to perform a planetary rotary movement about that central axis. Thus by rotating the light guide end portion thru at least 180°, it is possible to ascertain how much it must be adjusted until the core is disposed at the center of the light guide end portion. The adjusting operation will possibly have to be repeated in order to achieve an optimum value.

The apparatus for carrying out the method is distinguished by the simplicity of its design and the efficiency of its functioning. By displacement of the punch member with the impressing segment in the high-precision bore, it is possible to ensure that the impressing tool is guided with an absolutely parallel-axis relationship. The post-impressing operation can be rationalised by a clamping device for rotatably accommodating the light guide end portion being disposed beneath the sleeve, and by the punch member being mounted non-rotatably in the bore. The clamping device serves as a support means for the impressing operation, when carrying out the post-impressing step with the punch member. At the same time it permits easy rotation of the light guide end portion in the sleeve. As the punch member is mounted non-rotatably in the bore, the impressing operation is always effected relative to the sleeve at the same position. The respective light guide end portion is positioned in the bore in such a way that the sector of the annular impression in which eccentricity of the fiber core has been detected comes to lie beneath the impressing segment. Manipulation of the adjusting device is substantially facilitated by virtue of the impressing segment always remaining in the same position.

The punch member is preferably displaceable with a pressing device which is displaceable above the sleeve against the biassing force of a spring substantially in parallel-axis relationship with respect to the axis of the bore. Particularly advantageous functioning of the adjusting device is achieved if the pressing device has an upper and a lower plate, wherein the plates are force-lockingly connected together at one end and extend substantially transversely with respect to the axis of the bore, while the free ends of the plates can be spread open with a screwthreaded spindle, and the free end of the lower plate can be pressed on to the punch member in the bore, when the plates are spread apart. The fact that the pressing device is in the form of plates permits the force to be applied to the punch member by way of a lever which extends substantially transversely with respect to the axis of the punch member. By virtue of the plates being spread apart, the force for impressing the material or the depth of penetration can be precisely controlled, the two plates which are connected at one end acting as spring means.

The adjusting device is advantageously arranged beneath the objective lens of a microscope in such a way that the axis of the bore is disposed on the optical axis of the microscope which is defined by cross hairs.

If the punch member and all members disposed between the punch member and the objective lens are provided with a thru bore, the post-impressing operation can be followed by means of the microscope. That avoids repetition of the post-impression operation until the optimum value is achieved, as the operator by means of the microscope can directly follow the way in which the fiber core moves upon actuation of the adjusting device.

If the punch member and the sleeve in which the punch member moves are made from hard metal or alloy or cemented carbide it is possible to achieve an extremely high and uniform level of precision.

If the light guide end portion has a centering sleeve of relatively hard material which surrounds the core portion of plastically deformable material, then uniformly optimum attenuation values can be maintained in the plug connection if the end face of the light guide end portion is bevelled at least outside the annular impression, in such a way that the centering sleeve is set back somewhat relative to the plane of the fiber end. As the core portion and the centering sleeve are made from different materials, those members also have different coefficients of thermal expansion. In the event of the end face on the light guide end portion being absolutely flat, that can have the result that the outer centering sleeve of the plug expands more than the core portion in which the light guide fiber is fixed and centered. If, in the respective plug connection, the end faces of the two centering sleeves come into contact with each other, then it will be seen that the ends of the fiber cores, which bear one against the other, could be set back somewhat so that a space of a few thousandths of a millimeter would occur between the adjacent light guide fibers. That would already result in attenuation due to the resulting Fresnel reflection. By virtue of the end face being chamferred or bevelled, it is made with a frustoconical configuration, with an extremely obtuse angle. It will be seen that in that way the end surface of the centering sleeve is set back somewhat relative to the end face of the core portion so that two light guide end portions which are disposed in mutually opposite relationship, in the coupling, come into contact with each other only with the fibers or with the core portions surrounding same. Dilation due to thermal expansion at the centering sleeves thus does not have any effect on the light guide fibers which are in contact with each other.

DESCRIPTION OF THE DRAWINGS

An embodiment of the invention is described in greater detail hereinafter and illustrated in the accompanying drawings, in which.

DESCRIPTION OF A PREFERRED EMBODIMENT

Figure 1:
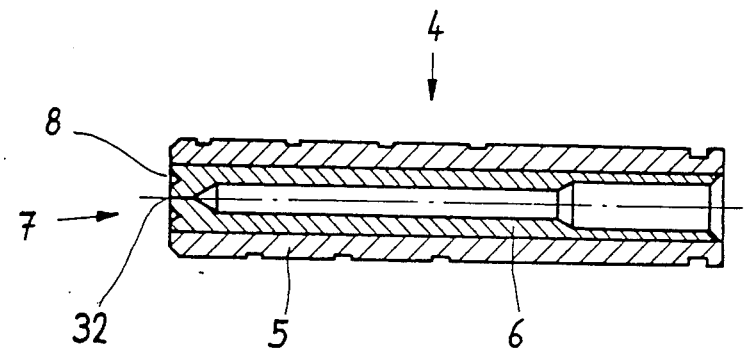
FIG. 1 shows a longitudinal section of a light guide end portion without plug members surrounding the end portion.

FIG. 1 shows a known light guide end portion 4 consisting of a centering sleeve 5, preferably of hard metal or alloy or cemented carbide, and a core portion 6 of plastically deformable material. The core portion 6 preferably comprises a non-ferrous metal alloy such as for example copper nickel alloy. provided at the end 7 is a bore 32 which is only slightly larger than a light guide fiber (not shown here). Also not shown are plug members around the light guide end portion, such as for example holding tube, cap nut and so forth.

Figure 4:
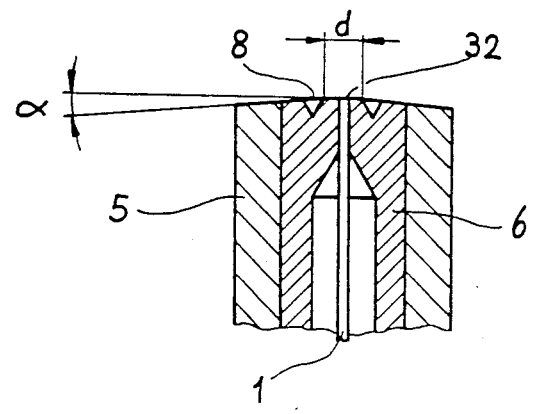
FIG. 4 is a view in cross-section thru the end part of the light guide end portion shown in FIG. 1, on an enlarged scale.

As can be seen in particular from FIG. 4, the light guide fiber 1 is fixed and centered at the end face in that an impression 8 is produced in the core portion 6 around the light guide fiber by means of an annular upsetting tool which is guided precisely concentrically with respect to the outside surface of the light guide end portion. The impression 8 produces not only a constriction in respect of the bore 32 but also central positioning of the light guide fiber 1. This pre-impressing method which is known per se and which is described in the inventors' above-mentioned prior publication does not however take account of any eccentricity of the fiber core within the light guide fiber.

Figure 9:
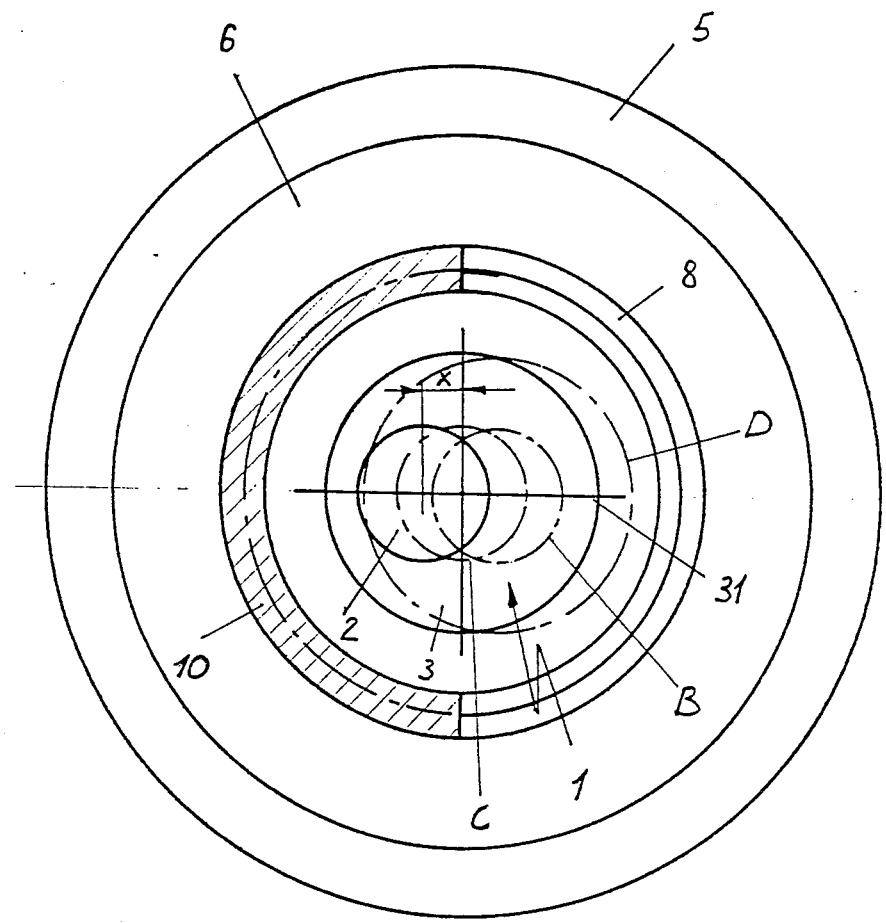
FIG. 9 is a plan view of the end face of a light guide end portion on a greatly magnified scale which is not in proportion.

It is therefore necessary to carry out a post-impressing operation; the mode of operation is shown in particular in FIG. 9. A front view on to the end face 7 of the light guide end portion again shows the centering sleeve 5 and the core portion 6. Disposed in the center is the light guide fiber 1 which is centered and fixed by the annular impression 8 which surrounds it. For reasons of enhanced clarity of the drawing, the proportions of the individual dimensions relative to each other were intentionally disregarded. Thus for example the outside diameter of the light guide end portion shown in FIG. 1 is in actual fact 3.5 mm while the bore 32 at the end face may have only a diameter of, for example, less than 0.2 mm.

As shown in FIG. 9, the light guide fiber 1 comprises a light-conducting core 2 and a casing 3 which is disposed around the core. In the present case the core 2 is not arranged in the center of the light guide fiber 1 but is displaced eccentrically by a distance X. That eccentric displacement can be ascertained, when viewing the end face on a magnified scale, by the light guide end portion being rotated about the central axis. Upon a rotary movement thru 180°, the core 2 performs a planetary movement about the center and takes up the position shown by reference B. In that connection, when viewing thru the microscope, the center is marked by cross hairs 31 so that eccentricity of the core 2 can be detected in a particularly simple manner.

In order to bring the core 2 into the center, an impressing segment is fitted into the already existing annular impression 8, more particularly in the sector of the impression in which the eccentricity was detected. The impressing segment 10 is shown in FIG. 9 as a hatched area and extends over an angle of 180°. It will be seen that the impressing segment must be fitted into the impression 8 in such a way that the straight line which passes thru the center of the fiber core 2 and the light guide end portion 4 coincides with the line bisecting the impressing segment. When the impressing segment 10 is pressed into the impression 8, the light guide fiber 1 moves with its core 2 towards the center of the light guide end portion until the core 2 takes up the central position marked by reference C. It will be seen that also causes a displacement of the casing 3, the new position of which, with the core centered, is denoted by reference D.

Figure 2:
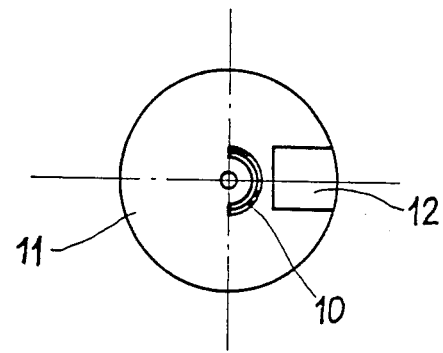
FIG. 2 shows a plan view of a punch member with impressing segment.
Figure 3:
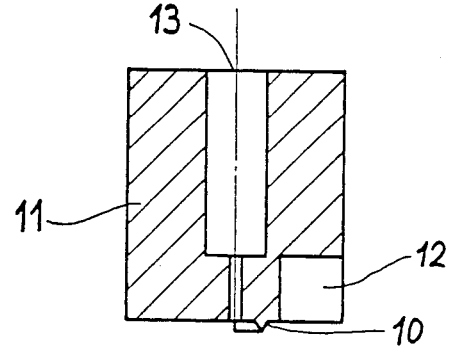
FIG. 3 is a view in cross-section thru the punch member shown in FIG. 2.

The actual impressing tool is shown in FIGS. 2 and 3. It comprises a cylindrical punch member 11 with the impressing segment 10 disposed at the one end face thereof. The impressing segment 10 may extend over an angle of 180° or over a smaller angle. The punch member 11 is provided with a thru bore 13 which, in the impressing operation, permits a view on to the end face of the light guide fiber 1. In order to fix the punch member non-rotatably in the adjusting device, the punch member is provided with a guide slot 12.

The mode of operation of the adjusting device in a preferred embodiment thereof is described hereinafter with reference to FIGS. 5 to 7. The adjusting device 9 comprises a clamping plate 40 at which the adjusting device can be clamped for example beneath a microscope. Disposed in the clamping plate is a sleeve 37 with a high-precision bore 38 for accommodating a light guide end portion. The inside diameter of that bore is of such a dimension that a light guide end portion can just be pushed thereinto, to be an accurate fit therein. The light guide end portion is fixed in a rotary knob 34 which is mounted rotatably in a clamping device 14. The clamping device 14 thus serves as a support means for carrying the reaction force in the impressing operation. The punch member 11 is mounted axially displaceably in the upper region of the sleeve 37. A guide projection 15 engages into the guide slot 12 in the punch member 11 so that the punch member is non-rotatably mounted in the bore 38.

The punch member 11 is actuated by a pressing device 16 which extends in a plate-like configuration substantially parallel to the clamping plate 40. The pressing device 16 comprises an upper plate 19 and a lower plate 20. The two plates are force-lockingly connected together at one end by means of screws 23. The two plates are mounted at a guide pin or bolt 24 on the clamping plate 40, wherein the condition of upper abutment can be fixed by a holding nut 33. The two plates are urged upwardly by a spring 17 which bears against a spring mounting means 36. The upper plate 19 is connected by means of guide pins 42 to the clamping device 14 thru the clamping plate 40. With that arrangement, the upper plate 19 carries the reaction forces, by way of the clamping device, in the pressing operation. The spring 17 thus also urges the clamping device 14 upwardly, with the clamped light guide end portion being held in the bore 38.

A screwthreaded sleeve 22 extends downwardly from the lower plate 20, with a screwthreaded spindle 18 of an impressing screw 35 being screwed into the screwthreaded sleeve 22. The screwthreaded bore in the screwthreaded sleeve 22 is conically bevelled or chamferred in the upper region, with a ball 21 being disposed in the conical entry portion. The ball 21 bears against the upper plate 19 in the marginal region of a bore 41. The lower plate 20 is displaceably guided on guide pins 42, in the region of the punch member 11. provided both in the lower plate and in the upper plate is an opening 43 which permits the objective lens to be moved as closely as possible to the end face of the light guide end portion, which is to be viewed.

A bore 45 is also provided in the relatively thin-walled portion 44 of the lower plate 20 which is pressed on to the punch member 11. The punch member 11 itself is not connected to the lower plate 20 but only lies in the bore 38, in a condition of being held by the guide projection 15.

Figure 5:
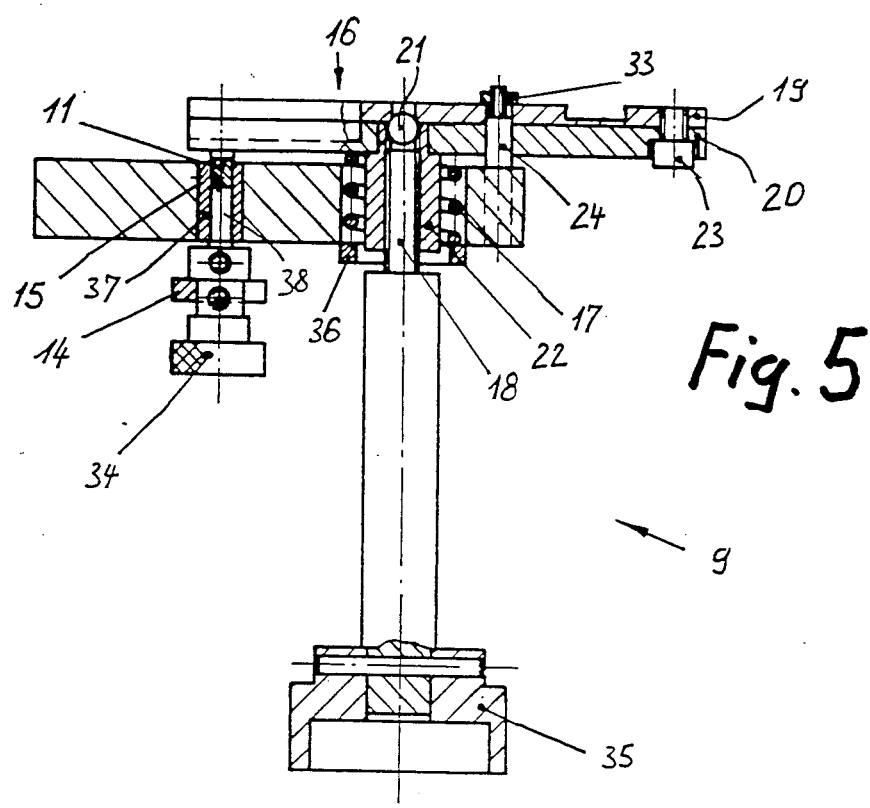
FIG. 5 is a view in cross-section thru an adjusting device.
Figure 6:
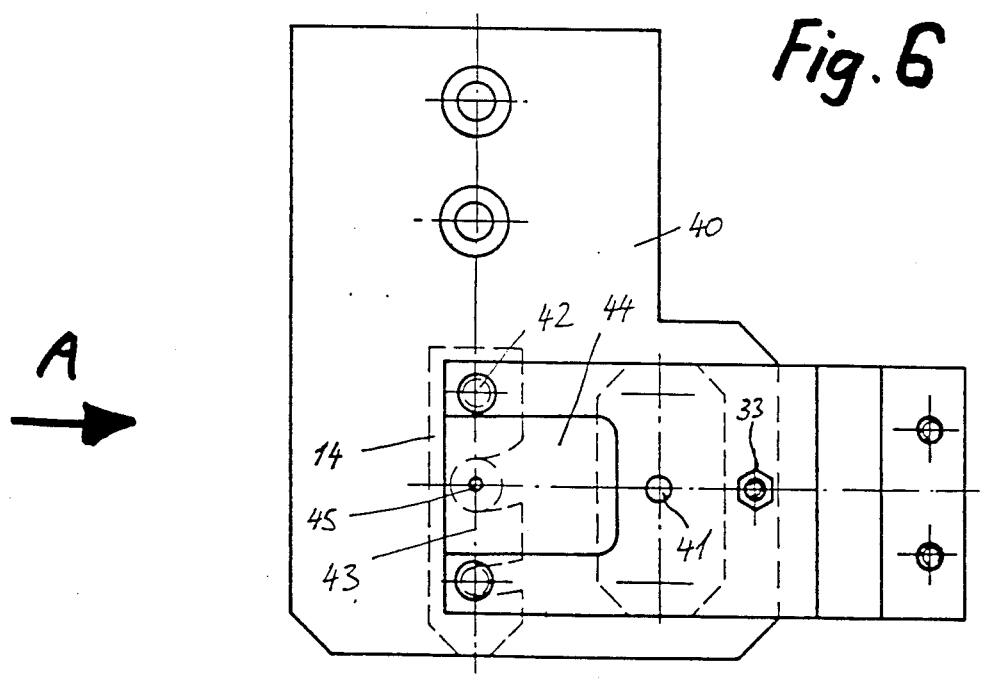
FIG. 6 is a plan view of the device shown in FIG. 5.
Figure 7:
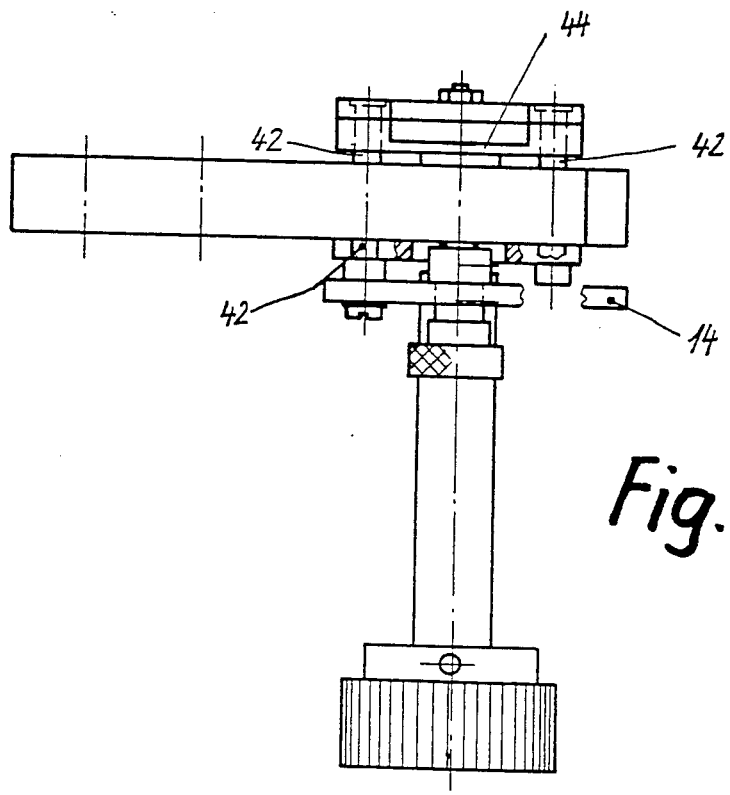
FIG. 7 is a side view of the adjusting device shown in FIG. 6, viewing from the direction indicated by the arrow A.
Figure 8:
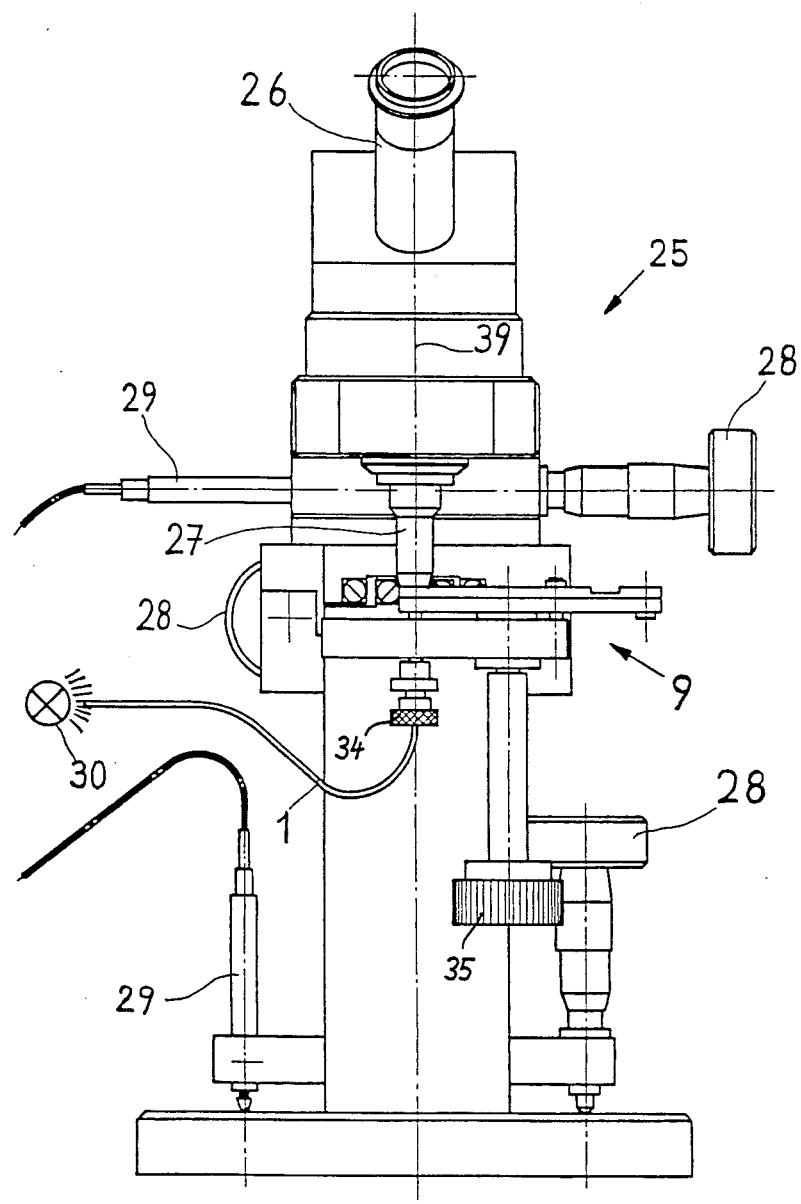
FIG. 8 shows a microscope with the adjusting device shown in FIGS. 5 to 7 mounted thereon.

As shown in FIG. 8, the adjusting device 9 as illustrated in FIGS. 5 to 7 is clamped to a microscope 25. In that arrangement the fixing method is such that the central axis of the bore 38 in the sleeve 37 coincides with the optical axis 39 of the microscope. The position of the objective lens 27 can be established in the three axes by way of adjusting screws 28, with a measuring probe 29 being associated with each axis, for the purposes of determining the distance covered. To prepare for the impressing operation, the light guide end portion 4 is pushed into the bore 38 and rotatably fixed in the clamping device 14. Light is fed into the light guide fiber 1 by way of a light source 30. When viewing thru the eyepiece of the microscope, then approximately the image shown in FIG. 9 will be seen, although of course in the correct proportions.

For the core positioning operation, the mode of operation is now as follows:

The light guide end portion is rotated in the sleeve 37 by means of the rotary knob 34. If, when doing that, no eccentric movement of the core 2 relative to the cross hairs 31 is detected, then the core 2 already extends in coaxial relationship with the central axis of the light guide end portion, and no post-impressing operation is required. If, upon the rotary movement being produced, an eccentric movement of the core 2 is detected, then the core is moved into the correct position relative to the stationary impressing segment 10. It will be appreciated that the impressing segment 10 cannot be viewed in the microscope. It is however possible to provide, in addition to the cross hairs, an optical marking which indicates to the viewer the position of the impressing segment or the line bisecting same, upon which the displacement occurs in the post-impressing operation.

When the core 2 has been turned into the correct relative position, the impressing screw 35 is slowly rotated. when that is done, the screwthreaded spindle 18 moves upwardly in the screwthreaded sleeve 22 and presses the ball 21 against the bore 41. As the two plates 19 and 20 are only connected together at one end, they can be spread open, under the effect of the force acting thereon. As the relative movement of the upper plate 19 is restricted by the guide pins 42, the lower plate 20 is spread open downwardly under the pressure of the ball 21 and against the force of the spring 17, in which respect the two plates which are made for example from metal primarily exert a spring action. When that occurs the ball 21 provides for uniform distribution of force. By virtue of that spreading movement, the punch member 11 is moved downwardly in the bore 38 and thus pressed against the end face of the clamped light guide end portion. The impressing segment 10 whose cross-sectional configuration is approximately adapted to that of the already existing pre-impression 8, now produces deformation at one side in the plastically deformable material of the core portion 6, and thus causes displacement of the position of the light guide fiber 1 with its core 2.

As both the punch member 11 and also the lower plate 20 are provided with a bore, the movement can be followed in the microscope. The screw 35 is turned until the core 2 extends concentrically with respect to the cross hairs 31. By carrying out a checking rotary movement at the rotary knob 34, it is possible to check whether the core 2 no longer performs any eccentric rotary movement after the impressing operation. If the impression were too great, then a correction would further have to be effected in the opposite direction.

It will be appreciated that other embodiments of the adjusting device can also be envisaged. In particular the image of the end face of the light guide end portion could be transmitted on to an image screen. It would also be possible to determine the eccentricity of the core by measurement of the light beam issuing from the core, on the optical axis.

As shown in FIG. 4, the end face 7 of the light guide end portion is bevelled or chamferred at an angle $\alpha$ with respect to the end face. The angle $\alpha$ may be for example about 2°. The bevel or chamfer which extends around the end face does not start from the center but from a circular surface having the diameter d, which remains flat. It will be seen that in that way the centering sleeve 5 is set back somewhat relative to the end of the fiber in the plane of the end face so that light guide end portions which are coupled together are in contact with each other only at their core portions.

We claim:

1. A method of accurately centering the core of a light guide fiber in a light guide end portion having a plastically deformable material surrounding said light guide fiber and presenting an end face transversely disposed with respect to said fiber with an end of said fiber substantially centrally disposed in said end face, the method comprising:

pressing an annular upsetting tool concentrically surrounding said end of said fiber against said end face to form an annular impression in said end face to fix and substantially center said fiber therein, thereby precentering said fiber relatively to a central axis of said light guide end portion;

clamping said light guide end portion with said fiber pre-centered therein into an adjusting device;

introducing light into said fiber from an end thereof remote from said end face;

detecting the relative position of the end of said fiber core at said end face with respect to said central axis of the light guide end portion by means of said light introduced into said fiber; and in the event of any deviation of said fiber core end at said end face with respect to said central axis, pressing a segment-shaped pressing tool into an arc of said annular impression selected by said adjusting device which subtends said deviation to locate said fiber core end on said central axis of said light guide end portion.

2. A method according to claim 1, in which said detection of any deviation of said fiber core end with respect to said central axis is effected by rotating said adjusting device about said central axis and observing any movement of said fiber core end relatively to a marking which is coaxial with respect to said light guide end portion.

3. Apparatus for accurately centering the core of a light guide fiber on a central axis of a light guide end portion having a plastically deformable material surrounding said light guide fiber and presenting an end face transversely disposed with respect to said fiber with an end of said fiber substantially centrally disposed in said end face and with an annular impression impressed to fix and substantially center said fiber in said end face, the apparatus comprising:

a sleeve formed with a high-precision bore for receiving said light guide end portion coaxially therein with said end face of said light guide end portion inside said sleeve;

means for introducing light into said fiber from an end thereof remote from said end face;

means for supporting said end portion with said end face inside said sleeve;

means for rotating said end portion about said central axis when supported in said sleeve;

a punch member including a segment-shaped impressing tool mounted for axial displacement in said bore with said tool towards said end face, said punch being formed with an observation passage enabling observation of the position of the end of said fiber core at said end face relative to said central axis; and means for forcing said punch member to press said segment-shaped impressing tool into a selected arc of said annular impression to correct any deviation of said fiber core from said central axis in the direction of said arc.

4. Apparatus according to claim 3, in which said means for rotating said end portion are rotatably mounted in a clamping device arranged beyond said sleeve and constituting said means for supporting said end portion, and in which said punch member is non-rotatably mounted in said bore.

5. Apparatus according to claim 3, in which said sleeve is vertically mounted on said supporting means, and said means for forcing said punch member is a pressing device displaceably mounted above said sleeve for movement towards said sleeve, the apparatus further including a spring mounted to oppose said movement of said pressing device by action along a line parallel to said bore.

6. Apparatus according to claim 3, in which said means for forcing said punch member comprise an upper plate and a lower plate mounted face to face transversely with respect to said bore and means locking said plates together at adjacent edges thereof, the apparatus also including screw means for spreading said plates apart so that their edges remote from said locking means are separated and means connecting said upper plate and said supporting means for said end portion, said plates being mounted for said lower plate to press on said punch member while reaction forces are transmitted by said connecting means to said upper plate when said plates are spread apart.

7. Apparatus according to claim 6, including a spring and a first abutment member mounted with said upper and lower plates between them and a second abutment member mounted for said spring to react thereagainst while pressing said plates against said first abutment thereby positioning said plates.

8. Apparatus according to claim 3, including a microscope having an objective lens mounted for viewing said end face thru said observation passage in said punch member, the axis of said bore being disposed on the optical axis of said microscope.

9. Apparatus according to claim 6, including a microscope having an objective lens and mounted above said plates with the axis of said bore disposed on the optical axis of said microscope, said end plates being shaped to enable said end face to be viewed thru said microscope and said observation passage in said punch member.

10. Apparatus according to claim 3, in which said sleeve and said punch member are each produced from one of the materials consisting of hard metal, hard alloy and cemented carbide.

11. A light guide end portion comprising a centering sleeve of relatively hard material having a central axis, a light guide fiber extending along said axis from one end of said sleeve, a centering mass of plastically deformable material interposed between said sleeve and said fiber to position said fiber on said axis, said centering mass being formed with a central end face transverse to said axis substantially at said one end of said sleeve, and also formed with an annular impression surrounding said end face, impressed to center and fix an end of said light guide fiber in said end face, said end of said light guide fiber having been accurately positioned by a method according to claim 1, and the light guide end portion being chamferred at least outside said annular impression so that said centering sleeve is set back relatively to said end of said light guide fiber.

* * * * *